(12) United States Patent
Song (10) Patent No.: US 7,976,082 B2
(45) Date of Patent: Jul. 12, 2011

(54) BUMPER-STAY STRUCTURE FOR VEHICLE

(75) Inventor: Dae Hyun Song, Seoul (KR)

(73) Assignee: Hyundai Motor Company, Seoul (KR)

( * ) Notice: Subject to any disclaimer, the term of this patent is extended or adjusted under 35 U.S.C. 154(b) by 26 days.

(21) Appl. No.: 12/500,350

(22) Filed: Jul. 9, 2009

(65) Prior Publication Data

US 2010/0072764 A1    Mar. 25, 2010

(30) Foreign Application Priority Data

Sep. 23, 2008  (KR) .................. 10-2008-0093316

(51) Int. Cl.
*B60R 19/34* (2006.01)
(52) U.S. Cl. ........................ 293/133; 293/155
(58) Field of Classification Search .............. 293/155, 293/133
See application file for complete search history.

(56) References Cited

U.S. PATENT DOCUMENTS

| | | | | |
|---|---|---|---|---|
| 5,403,049 | A * | 4/1995 | Ebbinghaus | 293/133 |
| 7,192,067 | B2 * | 3/2007 | Hansen | 293/133 |
| 7,581,778 | B2 * | 9/2009 | Maya et al. | 296/132 |

FOREIGN PATENT DOCUMENTS

| | | |
|---|---|---|
| EP | 0 647 794 A1 | 4/1995 |
| JP | 2004-189171 A | 7/2004 |
| KR | 1998-017902 U | 7/1998 |
| KR | 1998-064055 U | 11/1998 |
| KR | 1999-019575 A | 3/1999 |

* cited by examiner

*Primary Examiner* — Dennis H Pedder
(74) *Attorney, Agent, or Firm* — Morgan, Lewis & Bockius LLP (57) ABSTRACT

A bumper-stay structure for a vehicle, provided between a bumper back beam and a side member, for absorbing collision impact, may include a buffer member fixed to a front end of the side member and having a first impact absorbing member slidably absorbing the collision impact while the collision impact is applied to the bumper back beam, a support member, a front end of which is coupled to the bumper back beam and a rear end of which is telescopically mounted to a front end of the buffer member, wherein the rear end of the support member is pressingly coupled by the first impact absorbing member to the buffer member so that the first impact absorbing member maintains pressing contact with the support member while the collision impact is applied to the bumper back beam.

8 Claims, 6 Drawing Sheets

BUMPER-STAY STRUCTURE FOR VEHICLE

CROSS-REFERENCE TO RELATED APPLICATION

The present application claims priority to Korean Patent Application Number 10-2008-0093316 filed Sep. 23, 2008, the entire contents of which application is incorporated herein for all purposes by this reference.

BACKGROUND OF THE INVENTION

1. Field of the Invention

The present invention relates to a bumper-stay structure for a vehicle, and more particularly, to a bumper-stay structure for a vehicle, which can effectively absorb impact so as to cope with both low-speed and high-speed vehicle collisions.

2. Description of Related Art

In general, a vehicle is provided with a bumper installed on a front or rear part of a vehicle to protect a body, and the bumper serves to absorb impact when a vehicle collision occurs.

Figure 1:
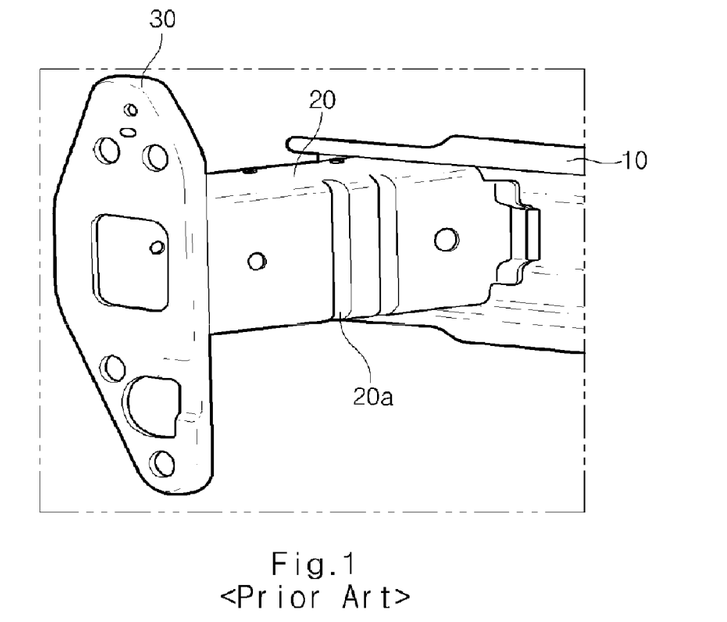
FIG. 1 is a perspective view illustrating an example of a conventional bumper stay for a vehicle.
Figure 2:
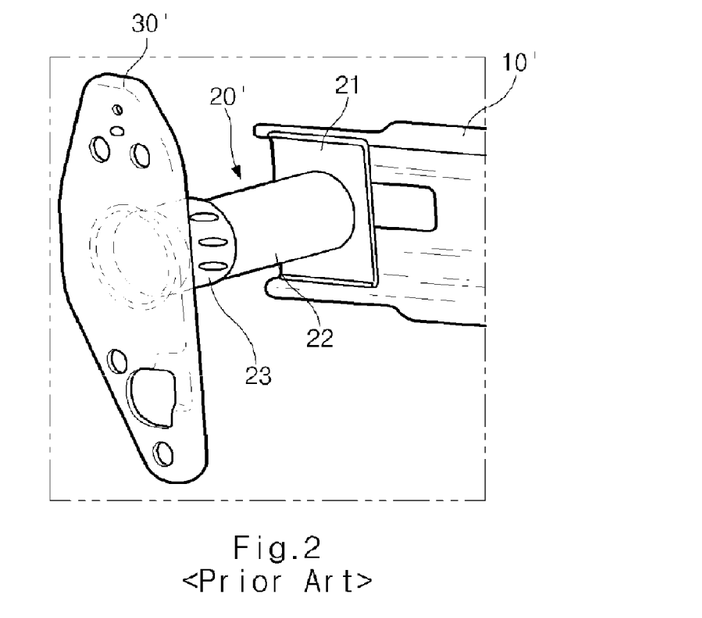
FIG. 2 is a perspective view illustrating another example of a conventional bumper stay for a vehicle.

FIG. 1 is a perspective view illustrating an example of a conventional bumper stay for a vehicle, and FIG. 2 is a perspective view illustrating another example of a conventional bumper stay for a vehicle.

In an example of a conventional bumper stay as illustrated in FIG. 1, side members constituting a body frame are provided on both sides of the body, and a bumper back beam 10 is provided on a front portion of the side member. Between the bumper back beam 10 and the side member, a bumper stay 20 for absorbing impact being transferred from the bumper back beam 10 is installed.

On the rear side of the bumper stay 20, a plate 30 for coupling the bumper stay 20 to a front end of the side member is provided, and on the periphery of the bumper stay 20, a deforming portion 20a for absorbing the impact is formed.

That is, when a high-speed vehicle collision occurs, the foaming portion 20a of the bumper stay 20 is deformed to absorb the impact which is transferred through the bumper back beam 10, and thus passengers can be safely protected.

On the other hand, in another example of a conventional bumper stay as illustrated in FIG. 2, side members constituting a body frame are provided on both sides of the body, and a bumper back beam 10' is provided on a front portion of the side member. Between the bumper back beam 10' and the side member, a bumper stay 20' for absorbing impact being transferred from the bumper back beam 10' is installed.

On the rear side of the bumper stay 20', a plate 30' for coupling the bumper stay 20' to a front end of the side member is provided.

The bumper stay 20' includes a support plate 21 coupled to the bumper back beam 10' by welding, a buffer member 22 coupled to the support plate 21, and a coupling member 23 inserted by pressure into a front end of the buffer member 22 and coupled to the plate 30'.

That is, when a high-speed vehicle collision occurs, the buffer member 22 is deformed to absorb the impact which is transferred from the bumper back beam 10', and thus passengers can be safely protected.

However, the examples of the conventional bumper stays 20 and 20' as described above have the problems that, although the bumper stays 20 and 20' can effectively absorb the impact when a high-speed vehicle collision occurs, they may not be deformed or may be bent when a low-speed collision occurs, and thus cannot effectively absorb the impact being transferred from the bumper back beam 10. In this case, the impact is transferred to the body through the side members, and thus the safety of passengers is threatened.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a bumper-stay structure for a vehicle, which can effectively absorb an impact from a collision so as to cope with both low-speed and high-speed vehicle collisions, and thus can safely protect passengers with damage to the vehicle body being prevented.

In an aspect of the present invention, a bumper-stay structure for a vehicle, provided between a bumper back beam and a side member, for absorbing collision impact, may include a buffer member fixed to a front end of the side member through a plate and having a pressingly fixing portion formed on an inner periphery of the front end, and a support member having a front end coupled to the bumper back beam and a rear end inserted into the front end of the buffer member, and pressingly fixed by the pressingly fixing portion.

The pressingly fixing portion may project with a height greater than that of a deforming portion formed on the buffer member.

At least two pressingly fixing portions may be formed along a periphery of the buffer member.

A plurality of deforming portions may be formed on a periphery of the buffer member.

Guide grooves may be formed on a periphery of a through hole formed on a surface of the plate, and guide protrusions are formed on a periphery of the rear end of the support member to be slide ably inserted into the guide grooves.

In another aspect of the present invention, a bumper-stay structure for a vehicle, provided between a bumper back beam and a side member, for absorbing collision impact, may include a buffer member fixed to a front end of the side member and having a first impact absorbing member slidably absorbing the collision impact while the collision impact is applied to the bumper back beam, a support member, a front end of which is coupled to the bumper back beam and a rear end of which is telescopically mounted to a front end of the buffer member, wherein the rear end of the support member is pressingly coupled by the first impact absorbing member to the buffer member so that the first impact absorbing member maintains pressing contact with the support member while the collision impact is applied to the bumper back beam.

A guide protrusion may be formed on a periphery of the rear end of the support member, the buffer member is fixed to the front end of the side member through a plate formed on the front end of the side member, and the plate includes a through hole, so that the rear end of the support member is slidably insertable into the side member through the through hole when the collision impact is applied to the bumper back beam.

The guide protrusion may be cone-shaped.

A guide protrusion may be formed on a periphery of the rear end of the support member, the buffer member is fixed to the front end of the side member through a plate formed on the front end of the side member, the plate includes a through hole, and a guide groove is formed on inner periphery of the through hole so that the guide protrusion of the support member is slidably insertable into the guide groove of the side member when the collision impact is applied to the bumper back beam.

The first impact absorbing member may include a pressingly fixing portion protruding inwards from an inner periphery of the buffer member so as to pressingly contact outer periphery of the support member.

The support member may include a receiving groove at the rear end thereof to receive the pressingly fixing portion of the buffer member therein.

A second impact absorbing member may be formed along a periphery of the buffer member.

The second impact absorbing member may include deforming portion.

The first impact absorbing member may include a pressingly fixing portion protruding from an inner periphery of the buffer member so as to pressingly contact outer periphery of the support member.

The support member may include a receiving groove at the rear end thereof to receive the pressingly fixing portion of the buffer member.

The pressingly fixing portion may project inwards with a height greater than that of the deforming portion.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a bumper-stay structure for a vehicle according to various embodiments of the present invention will be described in detail with reference to FIGS. 3 to 7B.

Figure 3:
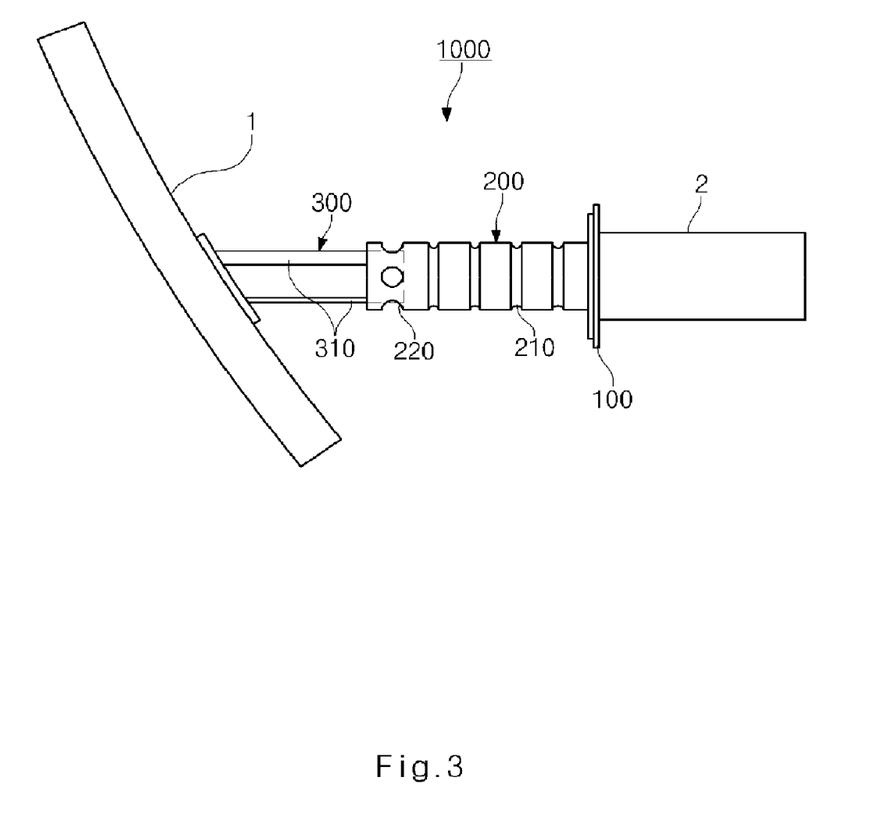
FIG. 3 is a side view illustrating an exemplary bumper-stay structure for a vehicle according to the present invention.
Figure 4:
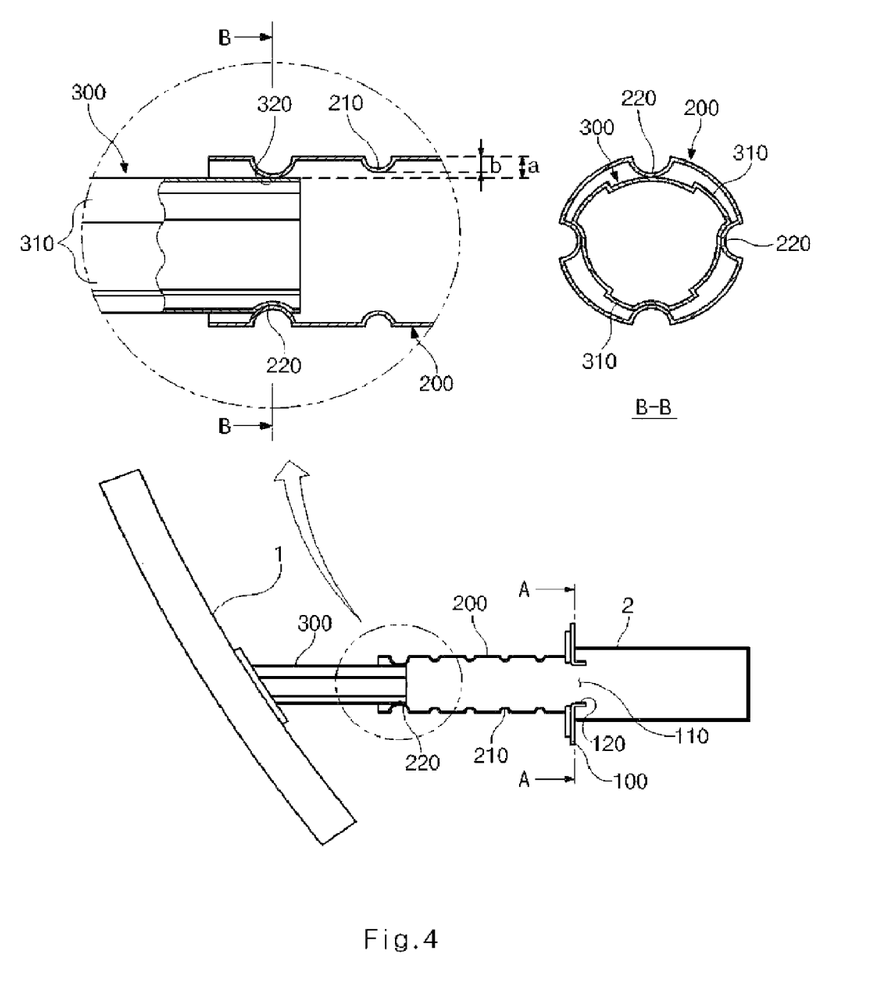
FIG. 4 is a sectional view illustrating an exemplary bumper-stay structure for a vehicle according to the present invention.

A bumper-stay structure 1000 for a vehicle according to various embodiments of the present invention, as illustrated in FIGS. 3 and 4, is provided between a bumper back beam 1 and a side member 2, and absorbs impact being transferred from the bumper back beam 1 to prevent the impact from being transferred to the side member 2 when a low-speed or high-speed vehicle collision occurs.

The bumper-stay structure 1000 for a vehicle according to various embodiments of the present invention includes a buffer member 200 fixed to a front end of the side member 2 through a plate 100, and a support member 300 coupled to the bumper back beam 1 and a front end of the buffer member 200.

The plate 100 is provided to couple the buffer member 200 to the side member 2, and is attached to the front end of the side member 2 by welding. In the center of a front surface of the plate 100, a through hole 110 is formed to connect with the side member 2, and on an inner periphery of the through hole 110, one or more guide grooves 120 are formed to stably guide the support member 300 to the inside of the side member 2 so that the support member 300 is inserted into the side member 2. For example, three guide grooves 120 are formed at specified intervals on a periphery of the through hole 110.

That is, the plate 100 fixes the buffer member 200 to the side member 2, and guides the support member 300 so that the support member 300 is inserted into the side member 2 when a vehicle collision occurs.

The buffer member 200 is in the form of a cylinder so that it can effectively absorb the impact when a high-speed collision occurs. A rear end of the buffer member 200 is coupled to an outer periphery of the through hole 110 by bolts or welding, and a plurality of deforming portions 210 is formed along the circumference of the buffer member 200 to make the buffer member deformed during the vehicle collision. On the front end of the buffer member, a pressingly fixing portion 220 for pressingly fixing the support member 300 is formed.

The deforming portion 210 is a foaming groove depressed along the outer periphery of the buffer member 200, and when the vehicle collision occurs, the deforming portions 210 are deformed inwardly and outwardly to absorb the impact.

In various embodiments of the present invention, the deforming portions 210 may be formed in the longitudinal direction of the buffer member 200 along the circumference thereof to increase efficiency to absorb the impact.

It is preferable that the pressingly fixing portion 220 that is formed to project inwardly of the buffer member 200 with a height greater than that of the deforming portion 210. Accordingly, the support member 300 is prevented from being interfered with the deforming portion 210 while the support member 300 is moved. However the position of the pressingly fixing portion 220 is not limited to the front end of the buffer member 200. It can be positioned in the middle or other place along the buffer member 200 so as to absorb the collision impact.

That is, as illustrated in an enlarged view of FIG. 4, the pressingly fixing portion 220 is formed to project as high as "a" from outer surface of the buffer member 200, while the deforming portion 210 is formed to project as high as "b" from the outer surface of the buffer member 200, and by a difference between "a" and "b", the support member 300 is prevented from being interfered with the deforming portion 210 when the support member 300 is moved.

In various embodiments of the present invention, at least two, and preferably, four or more pressingly fixing portions 220 may be formed on the inner periphery of the front end of the buffer member 200 to achieve a stable fixing of the support member 300 and to prevent the rotation of the support member 300.

In other embodiments of the present invention, the support member 300 may include a receiving groove 320 having substantially the same curvature as that of the pressingly fixing portion 220 of the buffer member 200 so that the support member 300 can be stably coupled to the buffer member 200.

The support member 300 is provided to effectively absorb the impact when a low-speed vehicle collision occurs. The front end of the support member 300 is coupled to the end part of the bottom surface of the bumper back beam 1 by bolts or welding, and the other end of the support member 300 is inserted into and pressingly fixed to the front end of the buffer member 200 by the pressingly fixing portions 220.

That is, the support member 300 is inserted into the buffer member 200 by the bumper back beam 1 when the low-speed vehicle collision occurs. At this time, since the support member 300 is inserted into the buffer member 200 in a state that it is pressingly fixed by the pressingly fixing portions 220, it absorbs the impact being transferred to the bumper back beam 1.

Figure 5:
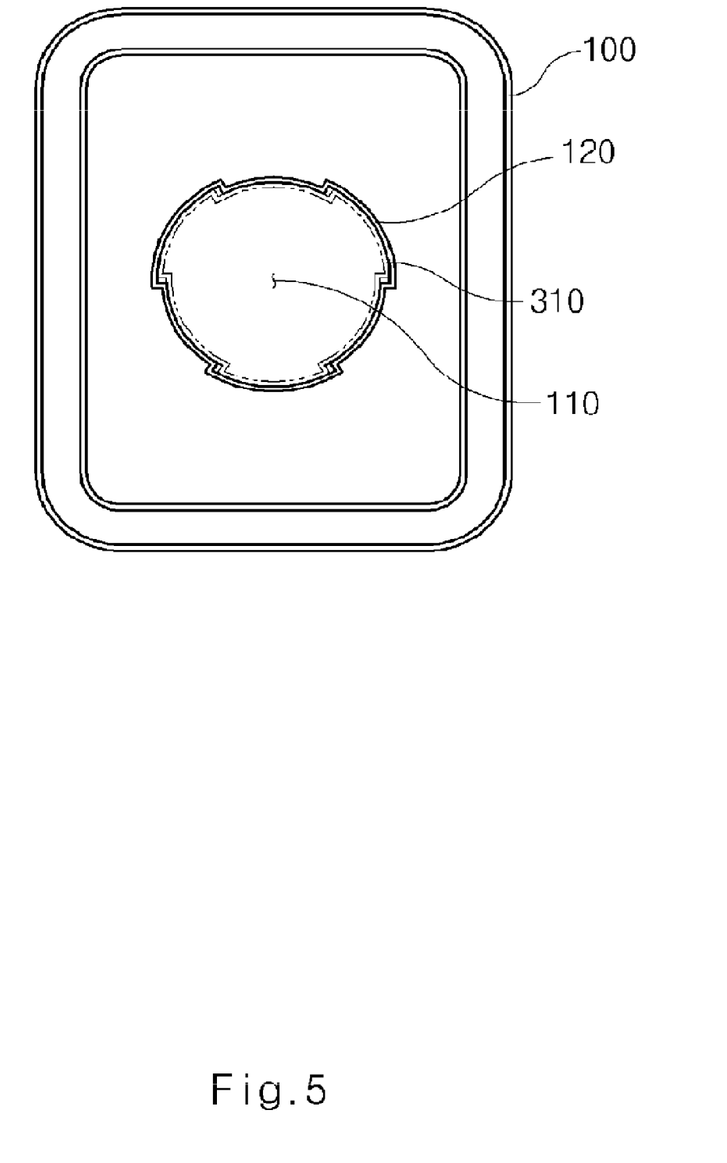
FIG. 5 is a sectional view taken along line A-A in FIG. 4.
Figure 6:
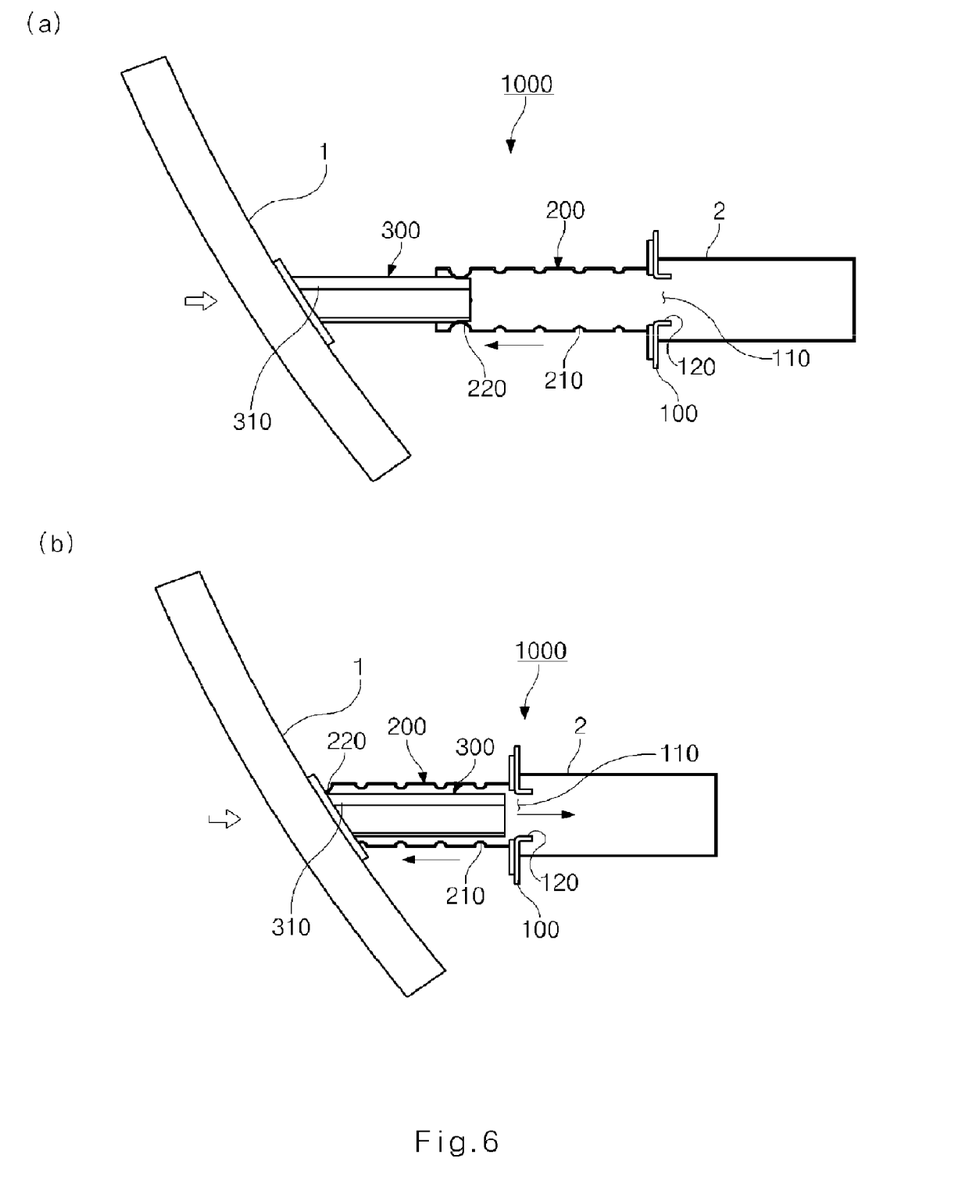
FIGS. 6A and 6B are views explaining the operation of an exemplary bumper-stay structure for a vehicle according to the present invention when a low-speed vehicle collision occurs.
Figure 7:
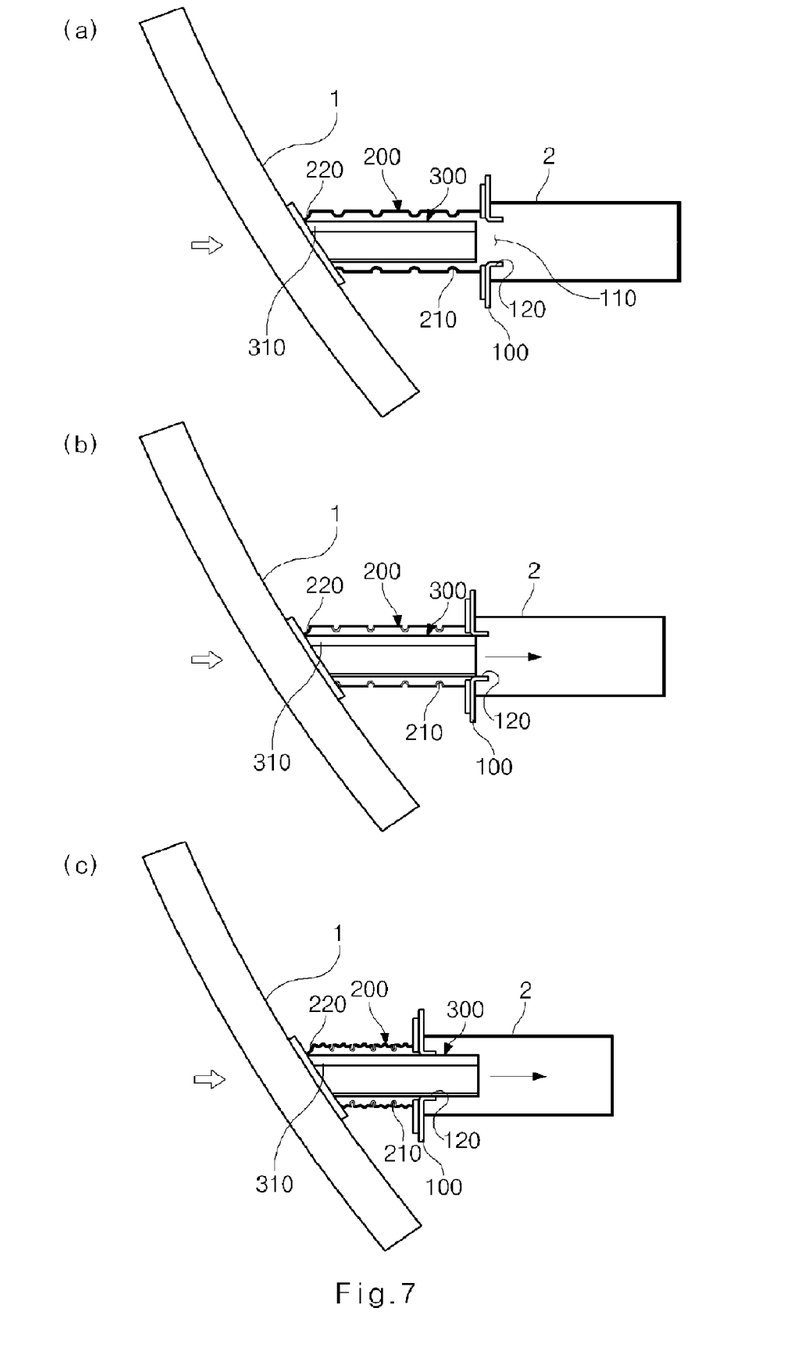
FIGS. 7A to 7C are views explaining the operation of an exemplary bumper-stay structure for a vehicle according to the present invention when a high-speed vehicle collision occurs.

At the other end of the support member 300, as illustrated in FIG. 5, guide protrusions 310 are formed to be slidably inserted into the guide grooves 120.

That is, when a high-speed vehicle collision occurs, the guide protrusions 310 of the support member 300 are inserted into the guide grooves 120, and thus the deforming portions 210 of the buffer member 200 are guided to be smoothly deformed by the bumper back beam 1.

In various embodiments of the present invention, the guide protrusion 310 of the support member 300 may be a cone shape and the guide grooves 120 may not be formed at the plate 100 so that the guide protrusion 310 of the support member 300 may be slidably inserted into the through hole 110.

Accordingly, when the low-speed vehicle collision occurs, the support member 300 slides into the buffer member 200 in a state that it is pressingly fixed to the front end of the buffer member 200, and thus it absorbs the impact.

On the other hand, when a high-speed vehicle collision occurs, the support member 300 slides into the buffer member 200, and then the whole deforming portions 210 of the buffer member 200 are deformed by the bumper back beam 1 to absorb the impact.

The operation of the bumper-stay structure for a vehicle having the above-described construction according to various embodiments of the present invention will be described with reference to FIGS. 6A to 7C.

Low-Speed Vehicle Collisions

As illustrated in FIGS. 6A and 6B, if a vehicle collision occurs during low-speed driving of the vehicle, impact is transferred to the bumper back beam 1 through a bumper, and the impact transferred to the bumper back beam 1 is effectively absorbed by the bumper-stay structure 1000 and cause most of the impact to vanish (See FIG. 6A).

That is, if a collision impact is transferred to the bumper back beam 1, the support member 300 slides into the buffer member 200 in a state that the support member 300 is pressingly fixed by the pressingly fixing portions 220 of the buffer member 200 to absorb the impact, and thus the impact of the bumper back beam 1 is prevented from being transferred to the side member 2 (See FIG. 6B).

As described above, the impact being transferred to the bumper back beam 1 when a low-speed vehicle collision occurs is absorbed through the bumper-stay structure 1000, and thus passengers can be safely protected.

High-Speed Vehicle Collisions

On the other hand, as illustrated in FIGS. 7A to 7C, if a vehicle collision occurs during a high-speed driving of the vehicle, impact is transferred to the bumper back beam 1 through the bumper, and then transferred to the bumper-stay structure 1000 that supports the bumper back beam 1.

That is, if a collision impact is transferred to the bumper back beam 1, the support member 300 slides into the buffer member 200 in a state that the support member 300 is pressingly fixed by the pressingly fixing portions 220 of the buffer member 200 to firstly absorb the impact, and thus the impact of the bumper back beam 1 is firstly prevented from being transferred to the side member 2 (See FIG. 7A).

Then, the guide protrusions 310 formed at the front end of the support member 300 slide into the side member 2 as they are coupled to the guide grooves 120 formed on the plate 100 (See FIG. 7B).

Then, the deforming portions 210 of the buffer member 200 are buckled by the collision impact being transferred to the bumper back beam 1 to secondly absorb the impact being transferred from the bumper back beam 1, and thus the impact of the bumper back beam 1 is secondly prevented from being transferred to the side member 2 (See FIG. 7C).

As described above, the impact being transferred from the bumper back beam 1 when a high-speed vehicle collision occurs is twice absorbed through the bumper-stay structure 1000, and thus passengers can be safely protected.

For convenience in explanation and accurate definition in the appended claims, the terms, "front" and "rear", are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A bumper-stay structure for a vehicle, provided between a bumper back beam and a side member, for absorbing collision impact, comprising:
    a buffer member fixed to a front end of the side member through a plate and having a pressingly fixing portion formed on an inner periphery of the front end of the buffer member; and
    a support member having a front end coupled to the bumper back beam and a rear end inserted into the front end of the buffer member, and pressingly fixed by the pressingly fixing portion,
    wherein a plurality of deforming portions are formed on a periphery of the buffer member; and
    wherein the pressingly fixing portion projects with a height greater than that of a deforming portion formed on the buffer member.

2. The bumper-stay structure of claim 1, wherein at least two pressingly fixing portions are be formed along a periphery of the buffer member.

3. The bumper-stay structure of claim 1, wherein guide grooves are formed on a periphery of a through hole formed on a surface of the plate, and guide protrusions are formed on a periphery of the rear end of the support member to be slidably inserted into the guide grooves.

4. A bumper-stay structure for a vehicle, provided between a bumper back beam and a side member, for absorbing collision impact, comprising:
   a buffer member fixed to a front end of the side member and having a first impact absorbing member slidably absorbing the collision impact while the collision impact is applied to the bumper back beam;
   a support member, a front end of which is coupled to the bumper back beam and a rear end of which is telescopically mounted to a front end of the buffer member, wherein the rear end of the support member is pressingly coupled by the first impact absorbing member to the buffer member so that the first impact absorbing member maintains pressing contact with the support member while the collision impact is applied to the bumper back beam; and
   wherein a plurality of deforming portions are formed on a periphery of the buffer member; and
   wherein a guide protrusion is formed on a periphery of the rear end of the support member, the buffer member is fixed to the front end of the side member through a plate formed on the front end of the side member, the plate includes a through hole, and a guide groove is formed on inner periphery of the through hole so that the guide protrusion of the support member is slidably insertable into the guide groove of the side member when the collision impact is applied to the bumper back beam.

5. The bumper-stay structure of claim 4, wherein the first impact absorbing member includes a pressingly fixing portion protruding inwards from an inner periphery of the buffer member so as to pressingly contact outer periphery of the support member.

6. The bumper-stay structure of claim 5, wherein the support member includes a receiving groove at the rear end thereof to receive the pressingly fixing portion of the buffer member therein.

7. The bumper-stay structure of claim 4, wherein a second impact absorbing member is formed along a periphery of the buffer member.

8. The bumper-stay structure of claim 5, wherein the pressingly fixing portion projects inwards with a height greater than that of the deforming portions.

* * * * *